(12) United States Patent
Castleman et al.

(10) Patent No.: US 8,346,680 B2
(45) Date of Patent: Jan. 1, 2013

(54) METHOD AND SYSTEM FOR DYNAMIC ADAPTATION OF USER EXPERIENCE IN AN APPLICATION

(75) Inventors: Wendy Castleman, San Jose, CA (US); Melanie Baran, San Diego, CA (US); Kavita Appachu, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1111 days.

(21) Appl. No.: 12/059,259

(22) Filed: Mar. 31, 2008

(65) Prior Publication Data

US 2009/0248594 A1 Oct. 1, 2009

(51) Int. Cl.
*G06F 17/00* (2006.01)
(52) U.S. Cl. .......................................................... 706/11
(58) Field of Classification Search ...................... 706/11
See application file for complete search history.

(56) References Cited

U.S. PATENT DOCUMENTS

| 7,080,322 | B2 * | 7/2006 | Abbott et al. | 715/744 |
| 7,860,895 | B1 * | 12/2010 | Scofield et al. | 707/802 |
| 2008/0262872 | A1 * | 10/2008 | Perry et al. | 705/3 |

OTHER PUBLICATIONS

"Reducing drivers' mental workload by means of an adaptive man-machine interface", W. Piechulla, C. Mayser, H. Gehrke, W. Konig, Transportation Research Part F: Traffic Psychology and Behaviour, vol. 6, Issue 4, Dec. 2003, pp. 233-248.*
Mayser et al. "Driver Workload Monitoring", Quality of Work and Products in Enterprises of the Future. Proceedings of the 50th-Anniversary conference of the GfA and the XVII Annual ISOES Conference in Munich, May 7-9, 2003, pp. 41-44, http://www.walterpiechulla.de/onlinePapers/gfa2003_MayserPiechullaWeissKoenig.pdf, downloaded Apr. 10, 2008.
Chen et al., "Using Mental Load for Managing Interruptions in Physiologically Attentive User Interfaces", Late Breaking Results Paper, Apr. 24-29, 2004, Vienna, Austria, pp. 1513-1516.
Piechulla, Walter et al., "Reducing Drivers' Mental Workload by Means of an Adaptive Man-Machine Interface", Transportation Research, 2003, pp. 233-248, http://www.psychologie.uni-wuerzburg.de/methoden/texte/2003_piechulla_workload.pdf, downloaded Apr. 10, 2008.

* cited by examiner

*Primary Examiner* — Kakali Chaki
*Assistant Examiner* — Mai T Tran
(74) *Attorney, Agent, or Firm* — Park, Vaughan, Fleming & Dowler LLP; Chia-Hsin Suen

(57) ABSTRACT

Some embodiments of the present invention provide a system that executes an application. During operation, the system physiologically monitors a user of the application with a set of sensors as the application executes. Next, the system assesses a mental state of the user based on physiological data collected from the sensors. Finally, the system changes the behavior of the application based on the assessed mental state to facilitate use of the application by the user.

21 Claims, 5 Drawing Sheets

Stock, Mutual Fund, and Other Investment Sales

*You Told Us*
- I participated in an Employee Stock Plan ☑

Did you have any of these investment activities in 2007?

- Sell Stock
- Exercise Stock Options
- Sell Mutual Funds
- Sell other types of investments    Learn More 302 Category
304 Synopsis
306
312 Link ◀ Back          Yes    No

FIG. 3A

METHOD AND SYSTEM FOR DYNAMIC ADAPTATION OF USER EXPERIENCE IN AN APPLICATION

BACKGROUND

Related Art

The present invention relates to a method and system for dynamic adaptation of user experience in an application.

Application software may be used to perform tasks of varying duration and complexity. Furthermore, different amounts of user input and/or interaction with the software may be required to complete the tasks. For example, a user may spend several hours entering information into a tax preparation application to prepare and file his/her taxes, several minutes on an email client to send and receive emails, and/or several seconds starting and setting up a media player to play music. User experiences with an application may also vary based on the application's complexity, the user's familiarity with the application, and/or the domain of the application. For example, an accountant may find a tax preparation application to be simple or straightforward to use, while a user unfamiliar with tax law may find the same tax preparation application to be unusable.

Intelligent user interface design may facilitate interaction between an application and users of varying ability levels. For example, more complex applications may include tutorials that explain the use of various features in the applications to the user. The user may also choose between different versions of an application's user interface based on the user's aptitude in using the application. In addition, applications such as computer games and standardized tests may modulate the difficulty of the task at hand (e.g., game play, answering test questions, etc.) based on the precision, accuracy, and/or correctness of the user's input to the applications. Hence, positive user experiences with applications may be aided by the use of adaptive, responsive, and/or customizable user interfaces.

SUMMARY

Some embodiments of the present invention provide a system that executes an application. During operation, the system physiologically monitors a user of the application with a set of sensors as the application executes. Next, the system assesses a mental state of the user based on physiological data collected from the sensors. Finally, the system changes the behavior of the application based on the assessed mental state to facilitate use of the application by the user.

In some embodiments, the system also obtains additional data associated with experiences of users interacting with the application and uses the additional data to further assess the mental state of the user.

In some embodiments, the additional data may include:
a. historical data collected from other users of the application;
b. a mental self-assessment from the user; or
c. a path navigated through the application by the user.

In some embodiments, the behavior of the application is changed upon detecting a rise in stress level, workload, or anxiety from the user.

In some embodiments, the behavior of the application is changed by matching the assessed mental state of the user to a response category of the application and updating a user interface (UI) of the application to provide the user with the response category.

In some embodiments, normal execution of the application is suspended if the assessed mental state of the user does not correspond to a suitable response category.

In some embodiments, the user is directed to a tutorial or an external resource upon suspending normal execution of the application.

In some embodiments, the sensors monitor a heart rate, a pupil size, an eye movement, a galvanic skin response, a saliva production, a core temperature, a keystroke dynamic, a mouse gesture, a facial expression, or a voice of the user.

BRIEF DESCRIPTION OF THE FIGURES

FIG. 3A shows an exemplary screenshot of a response category in accordance with an embodiment of the present invention.

DETAILED DESCRIPTION

Figure 1:
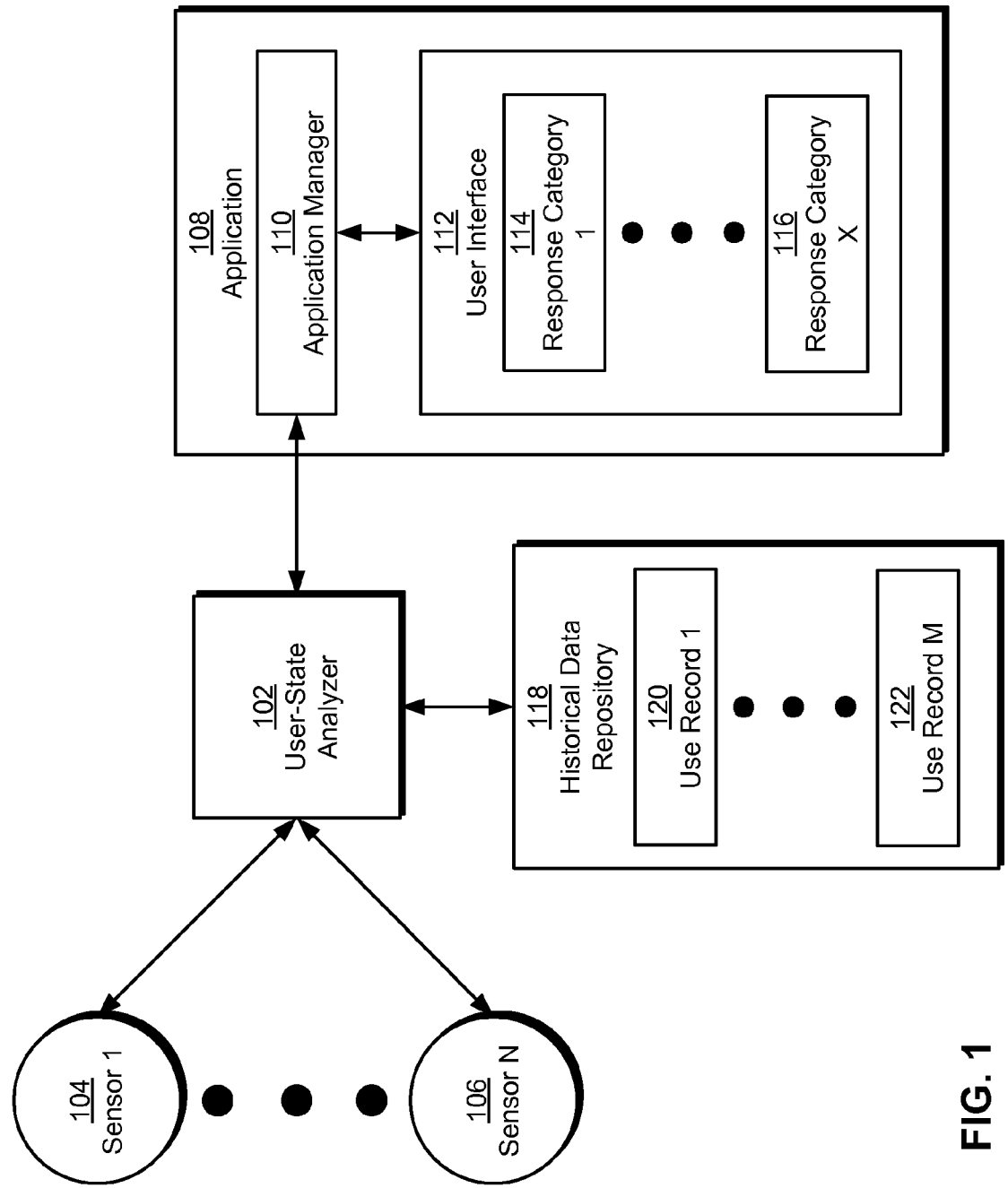
FIG. 1 shows a schematic of a system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system perform the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field programmable gate arrays (FPGAs), and other programmable-logic devices now known or later developed. When the hardware modules are activated, the hardware modules perform the methods and processes included within the hardware modules.

Embodiments of the invention provide a method and system for executing an application. The application may correspond to application software such as a word processor, an email client, a web browser, and/or a tax preparation application. The application may be used to perform one or more tasks for a user of the application, such as creating documents, display web pages, and/or preparing tax forms for the user. Moreover, user interaction with the application may be accomplished through the application's user interface.

Specifically, embodiments of the invention provide a method and system for dynamically adapting the user's experience in the application. In one or more embodiments of the invention, the user is physiologically monitored with a set of sensors during use of the application. The sensors may monitor physiological attributes such as the user's heart rate, pupil size, eye movements, galvanic skin response, saliva production, core temperature, keystroke dynamic, mouse gestures, facial expressions, and/or voice. The physiological data collected from the sensors may be used to assess a mental state of the user, which may then be used to dynamically change the behavior of the application to improve the user's experience with the application. For example, a rise in the user's stress level, workload, or anxiety may trigger an increase in the level of detail, explanation, and/or instruction provided by the application's user interface.

Additional data associated with user experiences of the application may also be used to assess the mental state of the user. The additional data may include historical data collected from other users of the application, a mental self-assessment from the user, and/or a path navigated through the application by the user. The application's behavior is then changed by matching the assessed mental state with a response category of the application and updating the user interface of the application to provide the user with the response category. If no suitable response category matches the user's assessed mental state, normal execution of the application may be suspended, and the user may be directed to a tutorial or outside resource.

FIG. 1 shows a schematic of a system in accordance with an embodiment of the present invention. As shown in FIG. 1, the system includes a user-state analyzer 102, a set of sensors (e.g., sensor 1 104, sensor N 106), a historical data repository 118, and an application 108. Each of these components is described in further detail below.

Application 108 may correspond to software that is used to perform a specific set of tasks for a user of the software. In one or more embodiments of the invention, application 108 corresponds to application software that is executed by a computer, such as a personal computer (PC), laptop computer, workstation, and/or server M 122) that may used by user-state analyzer 102 as references in analyzing the current user's interaction with application 108. Each use record may include information regarding another user's interaction with application 108, such as physiological data collected from the other user, assessments of the other user's mental state during use of application 108, and/or the other user's path through application 108. For example, if use records in historical data repository 118 indicate that a specific demographic tends to find a section of application 108 stressful and the current user fits the demographic, user-state analyzer 102 may analyze the current user's physiological data in view of the use records to detect signs of stress during use of that section.

The additional data may also include a mental self-assessment from the user and/or a path navigated through application 108 by the user. For example, the user may have the option to rate different sections of application 108 as the user uses and/or completes the sections. The ratings may be numerical (e.g., 1 to 10), alphabetical (e.g., A, B, C, etc.), and/or descriptive (e.g., "satisfied," "neutral," "unsatisfied"). User-state analyzer 102 may use the ratings along with historical (e.g., use records) and physiological data to assess the user's mental state. Similarly, the user's path through application 108 may provide additional information regarding the user's perception of and/or capability in using application 108.

In one or more embodiments of the invention, the behavior of application 108 is changed based on the user's assessed mental state to facilitate use of application 108 by the user. In particular, an application manager 110 in application 108 may change the behavior of application 108 by matching the assessed mental state of the user to a response category (e.g., response category 1 114, response category X 116) of application 108. In one or more embodiments of the invention, different response categories of application 108 are used to accommodate variations in the ability to understand and use application 108 by different users. Simpler response categories may target more advanced users and may include fewer instructions, detail, and/or explanation, whereas more complex response categories may target beginning and/or novice users and may include more detail, instructions, and/or explanation. For example, a tax preparation application may operate in a simple response category when used by an accountant and in a more complex response category when used by a first-time tax-filer. Consequently, simpler response categories may correspond to low levels of stress, workload, and/or anxiety in the user, while more complex response categories may correspond to higher levels of stress, workload, and/or anxiety in the user.

Once a match between the user's mental state and a response category is found, user interface 112 is updated to provide the user with the response category. The response category may then allow the user to interact with application 108 more easily and/or efficiently. For example, the pace of an online course may be modified based on the user's ability to learn and grasp new material. However, if the user's current mental state lacks a suitable response category from application 108, the normal execution of application 108 may be suspended and the user directed to a tutorial and/or outside resource, such as customer service or technical support. For example, the user may be prompted to speak with technical support if user interface 112 is displaying the most complex response category and the user is still having trouble with application 108.

Figure 2:
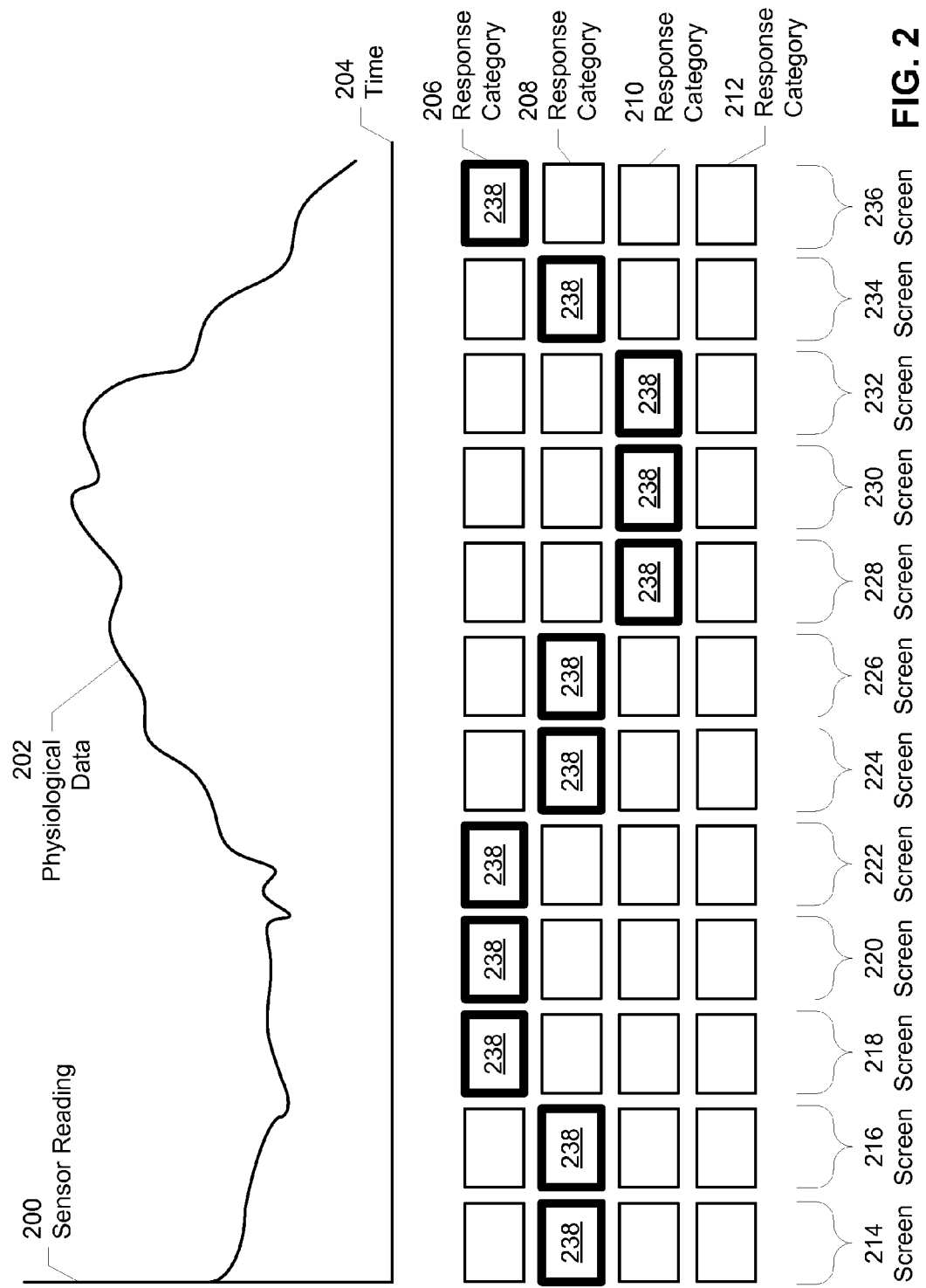
FIG. 2 shows data related to a user experience of an application in accordance with an embodiment of the present invention.

FIG. 2 shows data related to a user experience of an application in accordance with an embodiment of the present invention. As shown in FIG. 2, the data includes physiological data 202 plotted as a sensor reading 200 over time 204. As described above, physiological data 202 may be collected from one or more sensors designed to physiologically monitor a user of the application during execution of the application by the user. For example, physiological data 202 may correspond to a physiological indicator of stress, such as a measure of the user's galvanic skin response and/or heart rate as detected by a set of electrodes attached to the user's skin.

In addition to physiological data 202, FIG. 2 also shows the user's path 238 navigated through the application over the same span of time 204. As shown in FIG. 2, path 238 includes a series of screens 214-236 traversing a set of response categories 206-212 in the application. Screens 214-236 may correspond to user interface screens viewed by the user as the user proceeds through the application. Specifically, the user's path 238 begins at screen 214 in response category 208, transitions to response category 206 at screen 218, reverts back to response category 208 at screen 224, moves to response category 210 at screen 228, then rapidly updates to response category 208 at screen 234 and finally to response category 206 at screen 236.

In one or more embodiments of the invention, response categories 206-212 correspond to differing levels of complexity in the user interface. For example, response category 206 may include the simplest screens, response category 212 may include the most complex screens, and response categories 208-210 may include screens of complexity in between response category 206 and response category 212. The complexity of each response category 206-212 may correspond to the level of detail, explanation, and/or assistance provided to the user by the application; response category 206 may include little to no detail or explanation, while response category 212 may include a high level of detail or explanation. The application may start in a default response category (e.g., response category 208 in screen 214), which may be based on the user's preferences, an estimated ability level of the user, historical data obtained from other users of the application, and/or other factors.

Furthermore, the response category 206-212 shown to the user may be updated as a function of physiological data 202 obtained from the user. In one or more embodiments of the invention, the user's mental state may be assessed by analyzing and/or processing physiological data 202. For example, the user's mental state may be determined by applying rules, heuristics, and/or learning systems (e.g., neural networks, Bayesian networks, Markov models, etc.) to physiological data 202. In addition, the user's mental state may be gauged as a function of several different attributes (e.g., stress, frustration, satisfaction, boredom, etc.), or as a single overall attribute (e.g., level of neural activity).

As the user's level of stress, excitement, neural activity, and/or workload increases, the application may change to a more complex response category 206-212 to facilitate use of the application by the user. For example, at screen 224, the application transitions from response category 206 to response category 208 because a rising sensor reading 200 prior to screen 224 may indicate a corresponding rise in stress level. As sensor reading 200 continues rising, the application updates to response category 210 at screen 228 to further accommodate the user's needs. Similarly, if the user experiences a reduction in stress, anxiety, excitement, and/or workload, the application may transition to a simpler response category to remove extraneous detail and to enable faster completion of tasks by the user. For example, decreases in sensor reading 200 may indicate a fall in the user's stress level and are followed by transitions to simpler response categories in screen 218 and screens 234-236.

As discussed above, the user's assessed mental state and/or interaction with the application may be influenced by additional data associated with user experiences of the application. The additional data may include historical data collected from other users of the application, a mental self-assessment from the user, and/or path 238 itself. For example, the application may transition to a different response category 206-212 based on both physiological data 202 collected from the user at a given point in the application and other users' assessed mental states at that point. Similarly, changes in the user's assessed mental state may be verified by a user-provided rating of his/her level of happiness and/or stress at various points in the application.

FIG. 3A shows an exemplary screenshot of a user interface response category in accordance with an embodiment of the present invention. More specifically, FIG. 3A shows an exemplary screenshot of a simple response category in a tax preparation application. As shown in FIG. 3A, the screenshot is related to a category 302 of "stock, mutual fund, and other investment sales." In addition, the screenshot includes a brief synopsis 304 of input previously provided by the user. Finally, the user interface includes a request 306 for input by the user, as well as a link 312 to additional information. Because the screenshot of FIG. 3A includes a small amount of explanation, detail, and/or assistance, the response category of the screenshot may be intended for a user familiar with investments and/or taxes, such as an accountant or investment professional.

Figure 3B:
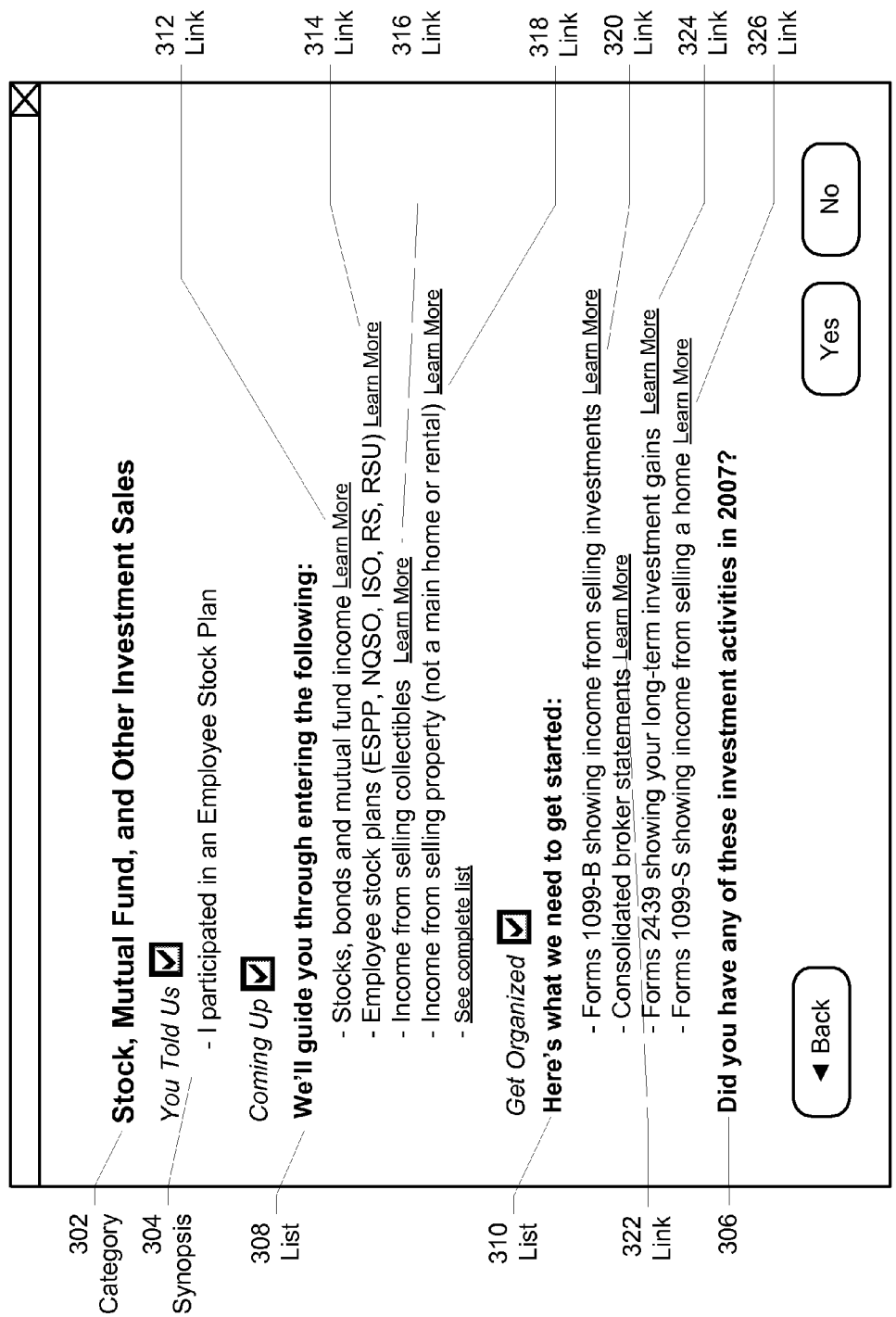
FIG. 3B shows an exemplary screenshot of a response category in accordance with an embodiment of the present invention.

FIG. 3B shows an exemplary screenshot of a response category in accordance with an embodiment of the present invention. In particular, FIG. 3B shows an exemplary screenshot of a complex response category in a tax preparation application. As with FIG. 3A, the screenshot of FIG. 3B is related to a category 302 of stock, mutual fund, and other investment sales. The screenshot also includes a synopsis 304 of previously provided user input and a request 306 for additional input from the user. However, unlike FIG. 3A, the screenshot of FIG. 3B includes a list 308 of topics to be covered in subsequent screens, as well as a list 310 of items that may be useful and/or required of the user to complete the tasks in list 308. Furthermore, each item in lists 308-310 includes a link 312-326 to additional information for that item. For example, links 312-318 may provide information regarding different types of investment income, and links 320-326 may provide information regarding documents relevant to investment income. As a result, the response category shown in FIG. 3B includes a greater amount of information, explanation, and/or assistance than the response category shown in FIG. 3A and may facilitate use of the tax preparation application by a more inexperienced user, such as a first-time tax-filer.

Figure 4:
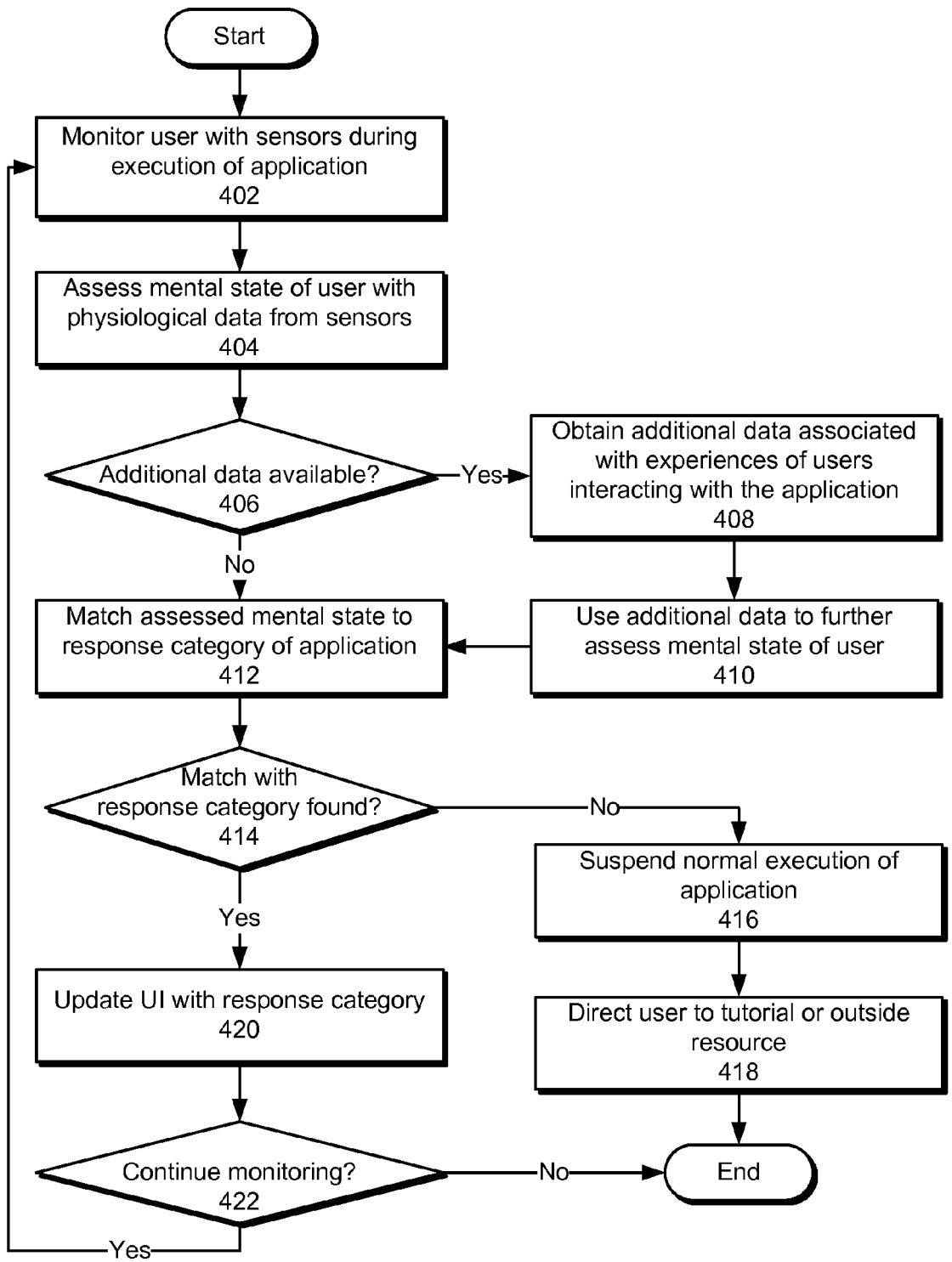
FIG. 4 shows a flowchart illustrating the process of dynamically changing a user experience in an application in accordance with an embodiment of the present invention.

FIG. 4 shows a flowchart illustrating the process of dynamically changing a user experience in an application in accordance with an embodiment of the present invention. In one or more embodiments of the invention, one or more of the steps may be omitted, repeated, and/or performed in a different order. Accordingly, the specific arrangement of steps shown in FIG. 4 should not be construed as limiting the scope of the invention.

Initially, a user of the application is monitored with a set of sensors during execution of the application (operation 402). The sensors may track physiological attributes such as the user's heart rate, pupil size, eye movements, galvanic skin response, saliva production, core temperature, keystroke dynamic, mouse gestures, facial expressions, and/or voice. Physiological data collected from the sensors is used to assess the mental state of the user (operation 404). For example, the user's heart rate, galvanic skin response, and tone of voice may be analyzed to determine the user's current level of stress. Furthermore, additional data regarding user experiences of the application may be available (operation 406) as an aid to assessing the user's mental state. The additional data may include historical data collected from other users of the application, a mental self-assessment from the user, and/or a path navigated through the application by the user.

If additional data is available, the additional data is obtained (operation 408) and used to further assess the mental state of the user (operation 410). For example, if the physiological data indicates that the user is experiencing a heightened level of stress at a particular point in the application, the physiological data may be verified by the user's reactions to previous parts of the application, the user's mental self-assessment at that point, and/or other users' mental state assessments at that point.

Next, the assessed mental state is matched to a response category of the application (operation 412). The response categories of the application may be tailored to a particular ability level in using the application and/or particular sections of the application. For example, a tax preparation application may include response categories for users ranging from first-time tax-filers to tax preparation professionals. Consequently, if the user's assessed mental state matches a response category (operation 414), the user interface of the application is updated with the response category (operation 420). As a result, the user is provided with a level of detail, instruction, and/or assistance that suits his/her skill, preferences, and/or ability level. The user may also continue to be monitored (operation 422) throughout the duration of the application's use. While the user is monitored (operation 402), the user's mental state is assessed using physiological and/or additional data (operations 404-410), the assessed mental state is matched to a response category of the application (operation 412), and if a match is found (operation 414), the user interface is updated with the response category (operation 420).

However, a suitable response category may not be found for a given mental state of the user. For example, the user may continue experiencing confusion even when provided with the maximum level of assistance by the application. If the assessed mental state of the user does not match a response category of the application, the normal execution of the application is suspended (operation 416), and the user may be directed to a tutorial or an outside resource (operation 418) in lieu of continued application execution. In other words, the user may be sent to an outside source of help if the application is unable to accommodate the user's needs.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for executing an application, comprising:
   physiologically monitoring a user of the application with a set of sensors during execution of the application;
   obtaining a path navigated through the application by the user;
   determining, by computer a stress level of the user based on physiological data collected from the sensors, and the path navigated through the application by the user; and
   changing the behavior of the application based on the determined stress level to facilitate user of the application by the user;
   wherein the behavior of the application is changed by,
      matching the determined stress level of the user to a response category of the application, and
      updating a user interface (UI) of the application to provide the user with the response category.

2. The method of claim 1, further comprising:
   obtaining additional data associated with experiences of users interacting with the application; and
   using the additional data to further assess the stress level of the user.

3. The method of claim 2, wherein the additional data includes at least one of:
   historical data collected from other users of the application; and
   a mental self-assessment from the user.

4. The method of claim 1, wherein the behavior of the application is changed upon detecting a rise in stress level, workload, or anxiety from the user.

5. The method of claim 1, wherein normal execution of the application is suspended if the assessed stress level of the user does not correspond to a suitable response category.

6. The method of claim 5, wherein the user is directed to a tutorial or an external resource upon suspending normal execution of the application.

7. The method of claim 1, wherein the sensors monitor at least one of a heart rate, a pupil size, an eye movement, a galvanic skin response, a saliva production, a core temperature, a keystroke dynamic, a mouse gesture, a facial expression, and a voice of the user.

8. A system for executing an application, comprising:
   a set of sensors configured to physiologically monitor a user of the application during execution of the application;
   a data-collection mechanism configured to obtain a path navigated through the application by the user;
   a user-state analyzer configured to assess a stress level of the user based on physiological data collected from the sensors and the path navigated through the application by the user; and
   an application manager configured to change the behavior of the application based on the assessed stress level of the user;
   wherein the application manager is configured to change the behavior of the application by:
      matching the assessed stress level of the user to a response category of the application; and
      updating a user interface (UI) of the application to provide the user with the response category.

9. The system of claim 8, further comprising:
   a historical data repository comprising a set of use records collected from users of the application,
   wherein the user state analyzer is further configured to assess the stress level of the user with the use records.

10. The system of claim 8, wherein the user-state analyzer is further configured to assess the stress level of the user with additional data associated with experiences of users interacting with the application, and wherein the additional data includes
    a self-assessment of mental state from the user.

11. The system of claim 8, wherein the behavior of the application is changed upon detecting a rise in stress level, workload, or anxiety from the user.

12. The system of claim 8, wherein normal execution of the application is suspended if the assessed stress level of the user does not correspond to a suitable response category.

13. The system of claim 12, wherein the user is directed to a tutorial or an external resource upon suspending normal execution of the application.

14. The system of claim 8, wherein the sensors monitor at least one of a heart rate, a pupil size, an eye movement, a galvanic skin response, a saliva production, a core temperature, a keystroke dynamic, a mouse gesture, a facial expression, and a voice of the user.

15. A non-transitory computer-readable storage medium storing instructions that when executed by a computer cause the computer to perform a method for executing an application, the method comprising:
    physiologically monitoring a user of the application with a set of sensors during execution of the application;
    obtaining a path navigated through the application by the user;
    assessing a stress level of the user based on physiological data collected from the sensors and the path navigated through the application by the user; and changing the behavior of the application based on the assessed stress level to facilitate use of the application by the user;

wherein the behavior of the application is changed by,
matching the assessed stress level of the user to a response category of the application, and
updating a user interface (UI) of the application to provide the user with the response category.

16. The non-transitory computer-readable storage medium of claim 15, the method further comprising:
obtaining additional data associated with experiences of users interacting with the application; and
using the additional data to further assess the stress level of the user.

17. The non-transitory computer-readable storage medium of claim 16, wherein the additional data includes at least one of:
historical data collected from other users of the application; and
a mental self-assessment from the user.

18. The non-transitory computer-readable storage medium of claim 15, wherein the behavior of the application is changed upon detecting a rise in stress level, workload, or anxiety from the user.

19. The non-transitory computer-readable storage medium of claim 15, wherein normal execution of the application is suspended if the assessed stress level of the user does not correspond to a suitable response category.

20. The non-transitory computer-readable storage medium of claim 19, wherein the user is directed to a tutorial or an external resource upon suspending normal execution of the application.

21. The non-transitory computer-readable storage medium of claim 15, wherein the sensors monitor at least one of a heart rate, a pupil size, an eye movement, a galvanic skin response, a saliva production, a core temperature, a keystroke dynamic, a mouse gesture, a facial expression, and a voice of the user.

* * * * *